United States Patent [19]

Hoehn

[11] Patent Number: 4,846,096
[45] Date of Patent: Jul. 11, 1989

[54] DISPLAY DEVICE

[75] Inventor: Wolfgang Hoehn, Liederbach, Fed. Rep. of Germany

[73] Assignee: VDO Adolf Schindling AG, Frankfurt am Main, Fed. Rep. of Germany

[21] Appl. No.: 836,290

[22] Filed: Mar. 5, 1986

[30] Foreign Application Priority Data

Mar. 6, 1985 [DE] Fed. Rep. of Germany ....... 3507867

[51] Int. Cl.⁴ .................. G01D 13/02; G01D 11/28; G09F 13/04
[52] U.S. Cl. .......................... 116/334; 116/DIG. 36; 40/561; 362/28
[58] Field of Search ............... 116/62.1–62.4, 116/334–337, DIG. 6, DIG. 15, DIG. 36, DIG. 45, DIG. 47; 340/705; 350/338, 339 R, 345; 358/236; 362/23, 28–31, 300; 40/544, 561, 562

[56] References Cited

U.S. PATENT DOCUMENTS 2,912,059 11/1959 Walker ........................ 116/62.1
3,838,909 10/1974 Fitzgibbons ................... 350/345
4,487,481 12/1984 Suzawa ......................... 350/345
4,621,306 11/1986 Sell ............................... 362/29
4,687,072 8/1987 Komuro ........................ 340/705

FOREIGN PATENT DOCUMENTS 1086906 8/1960 Fed. Rep. of Germany ..... 116/62.1
3120601 12/1982 Fed. Rep. of Germany ..... 340/705

Primary Examiner—William A. Cuchlinski, Jr.
Assistant Examiner—W. Morris Worth
Attorney, Agent, or Firm—Martin A. Farber

[57] ABSTRACT

A display device, particularly for automotive vehicles, having a transparent display panel on which opaque characters and symbols can be represented and over the front of which a pointer is movable. Ambient light can pass through the display panel from the side away from the observer to the side towards the observer. On this side of the display panel away from the observer there is arranged a background surface, the projection of the contour of the display panel from the observer onto the background surface being smaller than the background surface as seen from the perspective of the observer.

8 Claims, 1 Drawing Sheet

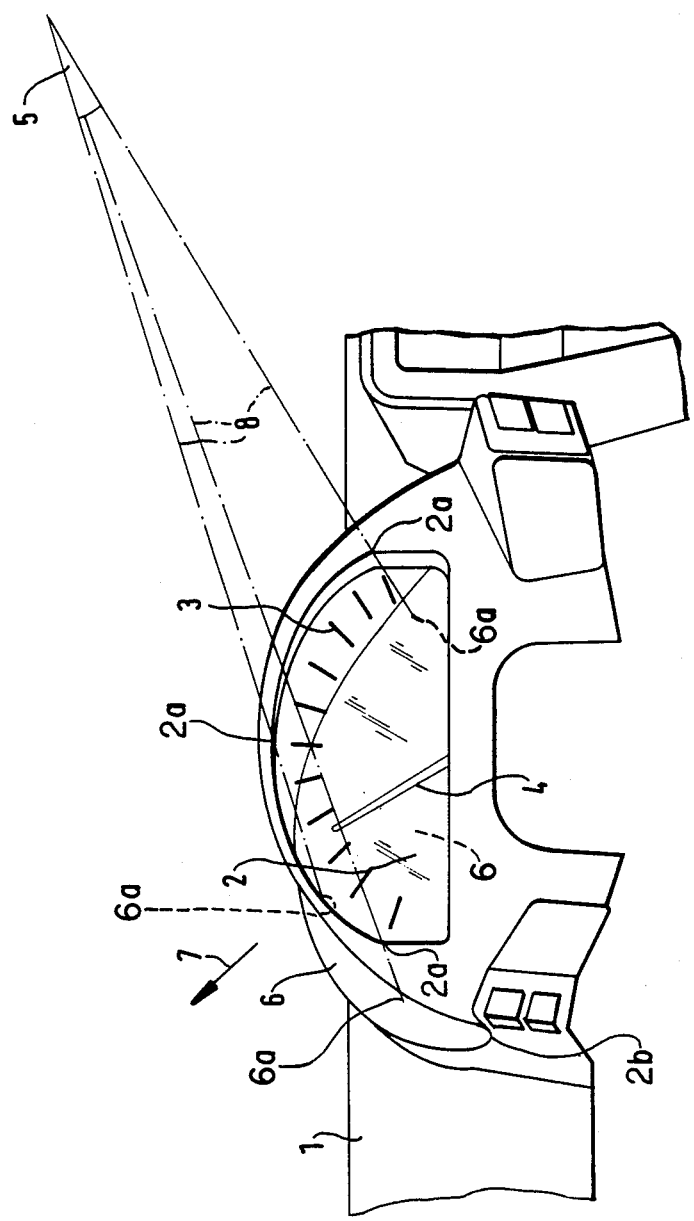

DISPLAY DEVICE

FIELD AND BACKGROUND OF THE INVENTION

The present invention relates to a display device, particularly for automotive vehicles, having a transparent display panel on which opaque characters and/or symbols can be represented and over the front of which a pointer is movable, wherein ambient light can pass through the display panel from the side (rear side) remote from the observer to the front side facing towards the observer.

In such displays objects including traffic which are present on the rear side of the display panel remote from the observer and visible through the display panel in addition to the characters and/or symbols displayed make it difficult to read the display.

This is particularly disadvantageous if the display panel is arranged on the instrument panel of an automotive vehicle in the direct field o view of the driver, since in such case the driver sees, during travel, all the movements of the traffic as background of the display panel. Intensive concentration is thus required in order to be able to read the display device. The driver is, however, thereby occupied for a longer period of time with reading the display device before he can again concentrate on the traffic. This lengthy distraction is, however, very dangerous in traffic.

SUMMARY OF THE INVENTION

The object of the invention is therefore to create a display device of the above type which can be read easily and rapidly.

This object is achieved, in accordance with the invention, in the manner that a background surface (e.g. 6) is provided, at the side of the display panel (2) remote from the observer, the projection (6a) of the contour (2a) of the display panel from the observer onto the background surface being approximately equal to or similar in size than the background surface (6) as seen from the perspective (e.g. 5) of the eye of the observer.

By this development the observer at all times sees the same background (nothing more), the uniformly smooth surface of which does not impair the readability of the characters and/or symbols displayed on the display panel.

In order to avoid reflections on the background surface which disturb the observer, said surface has a reflection-reducing surface.

The display panel is preferably clearly transparent.

In order to be able to display movable characters and symbols, the display panel may be a transmissive liquid-crystal display.

Both in the case of such a liquid-crystal display and in the case of a normal pointer display, opaque characters and/or symbols can be arranged in fixed position on the display panel.

The display device is preferably arranged on the instrument panel of an automotive vehicle in the direct field of view of the driver. The background surface can possibly be formed as an integral part of the shelf (top of dashboard) in front of the windshield.

Since the position of the eyes of the driver is higher than the display panel of the display device, the background surface can be developed so as to slope upwardly in the direction of travel starting, for instance, from the lower edge of the display panel forming a spacing from the rear side of display panel as the background surface slopes up. The appearance of the lightweight construction of the display device is retained in this case.

BRIEF DESCRIPTION OF THE DRAWING

One embodiment of the invention is shown in the drawing and will be described in further detail below. The sole FIGURE of the drawing is a perspective view of a display device.

DETAILED DESCRIPTION OF THE PREFERRED EMBODIMENT

The display device shown is arranged on the instrument panel 1 of an automotive vehicle, in the direct field of view of the driver, in front of the windshield, not shown. The opaque graduation marks of a scale 3 are applied on a clearly transparent display panel 2 in front of which a pointer 4 can swing. From the side of the display field 2 remote from the observer (the rear side in the drawing), light entering the inside of the vehicle through the windshield can pass through the display panel 2 from its rear side between a background surface 6 and the rear of the display panel 2 so that the scale 3 and the pointer 4 appear in skeleton-like fashion against a bright background.

From the position of the eyes 5 of the driver the background of the display panel 2 is formed by the background surface 6 which slopes upwardly in the direction of travel 7 towards the windshield, starting at the lower edge 2b of the display panel 2 forming a spacing from the rear side of display panel as the background surface slopes up. The background surface 6 is of such size that the projection 6a of the contour 2a of the display panel 2 from the eyes 5 of the driver onto the background surface 6 is smaller than the background surface 6 as seen from the perspective of the driver. This projection is shown by the dash-dot lines 8.

Due to the fact that the background surface 6 is larger than the projection shown of the contour of the display panel 2, the background surface 6 at all times forms a uniform background even for drivers of different height and thus different eye level.

Disturbance by a distracting background (e.g. traffic movements as background of the display panel of the prior art as noted in the introduction of this specification) is thus not possible since the background surface 6 is always interposed in the viewing path of the eyes.

I claim:

1. In a display device, particularly for automotive vehicles, having a transparent contoured display panel extending upwardly away from a support means and including a display of symbols and/or other indicia to an observer, the display being made visible by passage of ambient light through the transparent display panel from a rear side remote from the observer who is located at a substantially fixed position with respect to a front side facing the observer, the improvement comprising means forming a reflection-reducing background surface, said background surface being arranged spaced apart from the rear side of the display panel so as to permit the ambient light to pass through the display panel, said background surface generally facing toward and visible by the observer through said display panel, whereby a viewing projection of the contour of the display panel from the eyes of the observer onto said background surface being at most approximately equal to the contour of the background surface as seen from the perspective of the eyes of the observer.

2. The display device according to claim 1, wherein the display panel is a transmissive liquid-crystal display.

3. The display device according to claim 1, wherein said symbols and/or indicia are in the form of
opaque characters and/or symbols on the display panel.

4. The display device according to claim 3, wherein said opaque characters and/or symbols are arranged fixed in position on the display panel.

5. The display device according to claim 1, wherein said support means is an instrument panel of an automatic vehicle said display device is arranged on said instrument panel in the direct field of view of the driver.

6. The display device according to claim 1, wherein said projection of the contour of the display panel from the eyes of the observer onto said background surface is smaller in size than the background surface.

7. The display device according to claim 1, further comprising
a pointer moveable over the front side of said display panel.

8. The display device according to claim 1, wherein said background surface slopes, from a lower edge of the display panel at the rear side thereof, upwardly inclined toward a front direction of the vehicle sloping away from the rear side of the display panel.

* * * * *